(12) United States Patent
Balasaygun et al.

(10) Patent No.: US 9,954,905 B2
(45) Date of Patent: Apr. 24, 2018

(54) INTELLIGENT/SELECTIVE COVERAGE MECHANISM

(71) Applicant: AVAYA, INC., Basking Ridge, NJ (US)

(72) Inventors: Mehmet Balasaygun, Freehold, NJ (US); Sandy Abramson, Freehold, NJ (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 14/154,379

(22) Filed: Jan. 14, 2014

(65) Prior Publication Data

US 2015/0201073 A1    Jul. 16, 2015

(51) Int. Cl.
*H04L 29/06* (2006.01)
*H04M 3/56* (2006.01)
*H04M 7/00* (2006.01)
*H04M 3/42* (2006.01)
*H04L 29/08* (2006.01)

(52) U.S. Cl.
CPC .... *H04L 65/1069* (2013.01); *H04L 29/06326* (2013.01); *H04M 3/42187* (2013.01); *H04M 3/56* (2013.01); *H04M 7/006* (2013.01); *H04L 65/1006* (2013.01); *H04L 67/306* (2013.01); *H04M 2203/2011* (2013.01); *H04M 2203/6009* (2013.01)

(58) Field of Classification Search
CPC ............. H04M 7/006; H04M 3/56; H04M 2203/2011; H04M 2203/5009; H04M 2203/5054; H04M 1/2535; H04M 2203/5018; H04M 2203/6009; H04M 3/42187; H04L 29/06326; H04L 65/403; H04L 67/306; H04L 65/1069
See application file for complete search history.

(56) References Cited

U.S. PATENT DOCUMENTS

| | | | | |
|---|---|---|---|---|
| 5,255,314 | A * | 10/1993 | Applegate | H04M 3/533 379/225 |
| 7,120,243 | B2 * | 10/2006 | Milton | H04M 3/4234 379/201.12 |
| 7,248,680 | B1 * | 7/2007 | Gainsboro | H04M 3/20 379/189 |
| 7,298,833 | B2 * | 11/2007 | Klein | H04M 3/42153 379/201.02 |
| 7,343,008 | B1 * | 3/2008 | Frankel | H04M 3/56 370/260 |
| 7,408,925 | B1 * | 8/2008 | Boyle | H04M 7/006 370/352 |
| 7,636,750 | B2 * | 12/2009 | Haldar | H04M 3/56 709/204 |
| 7,751,536 | B1 * | 7/2010 | Abramson | H04L 65/1096 370/354 |
| 8,107,361 | B2 | 1/2012 | Baker et al. | |
| 8,160,585 | B2 | 4/2012 | Abramson et al. | |
| 8,458,253 | B1 * | 6/2013 | Sojka | H04L 65/1046 370/352 |

(Continued)

*Primary Examiner* — Lisa Hashem

(57) ABSTRACT

Disclosed is a system and method for enabling a caller to specify call coverage and bridging treatment preferences and or directives. The treatment may be specified by using SIP header parameters of an INVITE request associated with the call. The treatment may also be specified by an enterprise communication system, or equivalent, by engaging an Interactive Voice Response (IVR) system to collect a caller's coverage preferences.

19 Claims, 2 Drawing Sheets

(56) References Cited

U.S. PATENT DOCUMENTS

| | | |
|---|---|---|
| 8,464,063 B2 | 6/2013 | Agarwal et al. |
| 8,488,760 B2 | 7/2013 | Abramson et al. |
| 8,594,297 B2 | 11/2013 | Balasaygun et al. |
| 2003/0043974 A1* | 3/2003 | Emerson, III .......... H04L 29/06 379/88.13 |
| 2003/0182374 A1* | 9/2003 | Haldar .................... H04M 3/56 709/205 |
| 2005/0265537 A1* | 12/2005 | Verbil ..................... H04M 3/56 379/207.13 |
| 2006/0270447 A1* | 11/2006 | Everson ............ H04L 29/06027 455/552.1 |
| 2006/0274675 A1* | 12/2006 | Kizhnerman ........... H04L 47/10 370/254 |
| 2007/0049331 A1 | 3/2007 | Abramson et al. |
| 2007/0091830 A1* | 4/2007 | Coulas ................ H04L 12/1813 370/260 |
| 2007/0111723 A1* | 5/2007 | Ahmed ................. H04M 1/725 455/426.1 |
| 2007/0263830 A1* | 11/2007 | Wengrovitz ...... H04M 3/42323 379/219 |
| 2008/0031437 A1* | 2/2008 | Rey ........................ H04M 3/56 379/202.01 |
| 2008/0075265 A1* | 3/2008 | Khanchandani .. H04M 3/42323 379/231 |
| 2008/0080691 A1* | 4/2008 | Dolan ................ H04M 3/42195 379/201.01 |
| 2008/0187124 A1 | 8/2008 | Abramson et al. |
| 2009/0164556 A1* | 6/2009 | Siegel ..................... H04L 67/16 709/203 |
| 2010/0048191 A1* | 2/2010 | Bender ............. H04M 3/42382 455/416 |
| 2010/0080374 A1* | 4/2010 | Hepworth ......... H04M 3/42365 379/202.01 |
| 2011/0044444 A1 | 2/2011 | Abramson |
| 2011/0069661 A1* | 3/2011 | Waytena, Jr. ......... H04L 63/102 370/328 |
| 2011/0075609 A1* | 3/2011 | Silver .................... H04L 12/66 370/328 |
| 2013/0147902 A1* | 6/2013 | Weiser ..................... H04N 7/15 348/14.08 |
| 2013/0163739 A1* | 6/2013 | Cazanas ................ H04M 3/563 379/202.01 |
| 2013/0185442 A1* | 7/2013 | Siegel ..................... H04L 67/16 709/227 |
| 2013/0272513 A1* | 10/2013 | Phadnis ............ H04M 3/42042 379/93.23 |
| 2014/0335818 A1* | 11/2014 | Jain ....................... H04M 15/10 455/406 |
| 2015/0382263 A1* | 12/2015 | Jain ....................... H04W 36/14 455/432.1 |

\* cited by examiner

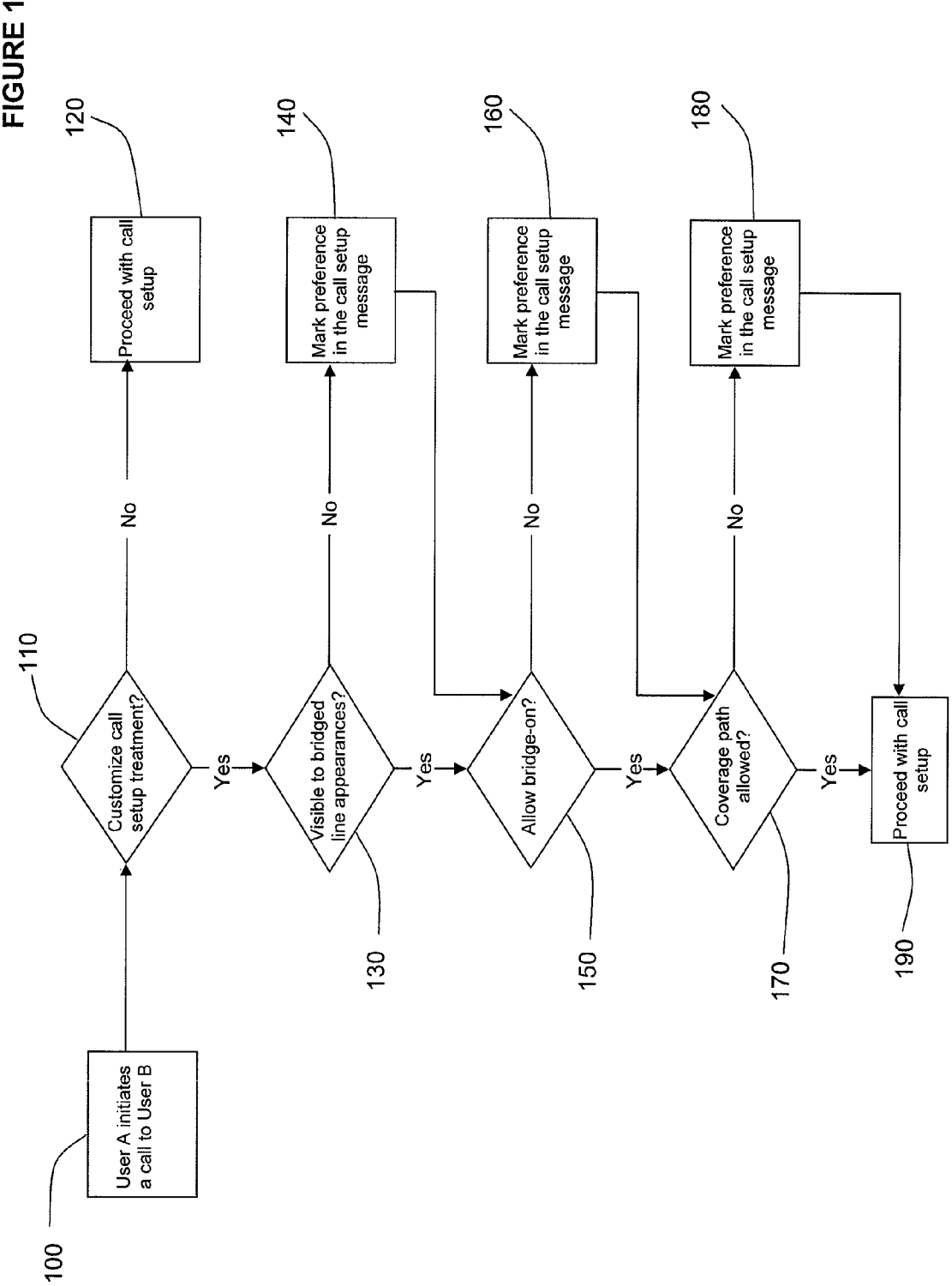

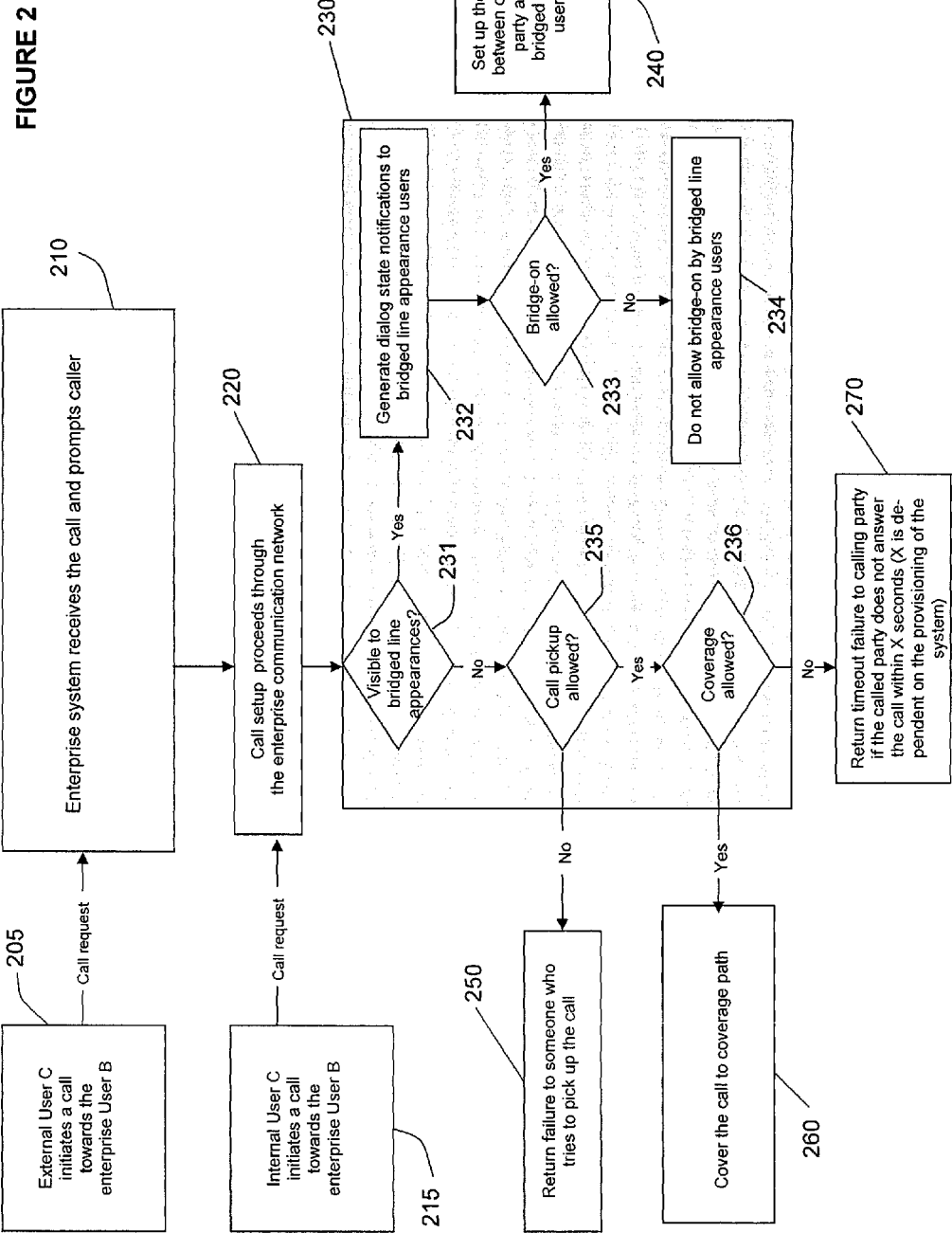

INTELLIGENT/SELECTIVE COVERAGE MECHANISM

FIELD OF THE INVENTION

The field of the invention relates call treatment for a call including call coverage and bridging treatment preferences and directives.

BACKGROUND OF THE INVENTION

In communication's systems, there are a number of options for controlling who can reach an individual via telephone, as well as how and when. The need to stay in contact with other people has become extremely important for many business people. A conference call is a telephone call in which the calling party wishes to have more than one called party listen in to the audio portion of the call. The conference calls may be designed to allow the called party to participate during the call, or the call may be set up so that the called party merely listens into the call and cannot speak. It is sometimes called ATC (Audio Tele-Conference). Conference calls can be designed so that the calling party calls the other participants and adds them to the call; however, participants are usually able to call into the conference call themselves by dialing a telephone number that connects to a "conference bridge" (a specialized type of equipment that links telephone lines). Companies commonly use a specialized service provider who maintains the conference bridge, or who provides the phone numbers and PIN codes that participants dial to access the meeting or conference call.

SUMMARY OF THE INVENTION

An embodiment of the invention may therefore comprise a method for handling a call in a communications system, the system comprising a first telecommunications terminal, a second telecommunications terminal and a telecommunications network, the method comprising initiating a call from the first telecommunications terminal to the second telecommunications terminal, applying system behavior to the call based on preferences of the first telecommunications terminal, and proceeding with the call.

An embodiment of the invention may further comprise a method of handling a call in a communications system, the system comprising a first telecommunications device and a second telecommunications device in an enterprise system, the method comprising initiating a call from the first telecommunication terminal to the second telecommunications terminal, in the enterprise network, applying system behavior to the call based on preferences of the first telecommunications terminal, and proceeding with the call.

An embodiment of the invention may further comprise a system for handling a call in a communication system, the system comprising a first telecommunications terminal, and a second telecommunications terminal in an enterprise system, wherein the first telecommunications terminal is enabled to initiate a call to the second telecommunications terminal via a session initiation protocol INVITE request, and the enterprise system is enabled to apply system call settings to the call based on preferences of the first telecommunications terminal.

BRIEF DESCRIPTION OF THE DRAWINGS

FIG. 1 shows a call setup request executed on a calling party side.

FIG. 2 shows a call treatment at an enterprise system.

DETAILED DESCRIPTION OF THE EMBODIMENTS

In an embodiment of the invention, a caller is enabled to specify call coverage and bridging treatment preferences and/or directives. A mechanism for this enablement may be through the use of SIP header parameters of an INVITE request associated with the call. The embodiment may include a server enabled to accept the directives and or preferences set by the caller and apply any related treatment options to the resulting call. It is understood that the server will also be enabled to deal with conflicts between the preferences and/or directives and treatment options on the called party's terminating side of the call.

The embodiment involves treatment of call privacy policy extension. A call may be able to specify that a particular call is a "private" call from the perspective of coverage features applicable on the call termination side. For example, a "private" call may accordingly not be reported to bridged line appearance users. Also, the ability of others to bridge into the particular call is accordingly restricted. The caller may be provided with the option of requesting setting the directive and/or preference to indicate that no other parties are allowed to bridge onto the call. This option may be used to override an exclusion policy that is set by the called party. The directive and/or preferences may be specified using an additional SIP header or header parameter in the call originated by the caller. For callers that are not in an enterprise network, the user may be given a voice activated prompt to activate this feature remotely for the call the use is initiating in regard to a called party that is in an enterprise network.

It is understood that SIP is Session Initiation Protocol. SIP is a signaling communications protocol used for controlling multimedia communication sessions such as voice and video calls over Internet Protocol (IP) networks. The protocol defines the messages that are sent between peers which govern establishment, termination and other essential elements of a call. SIP can be used for creating, modifying and terminating sessions consisting of one or several media streams. SIP can be used for two-party (unicast) or multi-party (multicast) sessions. Other SIP applications include video conferencing, streaming multimedia distribution, instant messaging, presence information, file transfer, fax over IP and online games. SIP works in conjunction with several other application layer protocols that identify and carry the session media. Media identification and negotiation is achieved with the Session Description Protocol (SDP). For the transmission of media streams (voice, video) SIP typically employs the Real-time Transport Protocol (RTP) or Secure Real-time Transport Protocol (SRTP). For secure transmissions of SIP messages, the protocol may be encrypted with Transport Layer Security (TLS).

The embodiment of the invention allows a caller to specify that the caller does not desire that the call be covered or handled by any recipient except the called party. This allows a caller to prevent any other party from picking up the call. This may also include voice mail system. Only the called party is permitted to handle the call. Essentially, call functionalities such as team, call pickup, voice mail coverage and call forwarding type features may be disabled when a caller activates this request. As noted, this may be provided in the SIP INVITE sent by the caller in a flag or other means. Those skilled in the art will understand how to use SIP to enable embodiments of the invention. It is also understood that a caller's preferences to restrict or prevent bridging and coverage may be overridden by the communication policies set for the enterprise network. For example, the network may allow a certain subset of callers to have the ability to impose coverage restrictions.

A default communication system's behavior is to apply the called party's incoming call features, priorities and preferences. These may be referred to herein as call termination features in that the called party is the terminating end of a call. A default communication system's behavior default will provide visibility of an incoming call to bridged line appearances, to allow bridge-ons from other parties. The default may also enable coverage path features such as voice mail, coverage group functionality and other features known in the art. The call termination treatment on the called party side of the call may be customized following the options that the caller can set in the call setup request. For example, the call termination treatment may be set to not accept calls that disallow bridged line appearance visibility or other treatments as mentioned herein.

In a calling system, the system may comprise a network, which may be a telecommunications network, a gateway a PBX (Private Branch Exchange) and a number or user devices connected to the system, such as telecommunications terminals. The system may include one or more mobile switching centers. Those skilled in the art will understand the use of the components of a telecommunications system in embodiments of the invention.

FIG. 1 shows a call setup request executed on a calling party side. The call setup shows a number of decision points in a process of customizing a call setup request executed on the calling party side. These call setup requests, as noted above, may conflict with preferences of the called party or with policies of the communication system. The calling party requests may be overridden by system policies or called party settings or preference options. At step 100, a caller (user A) will initiate a call to a called party (user B). After initiation of the call, a determination is made whether to customize the call at step 110. The determination may be made by the system which disallows or automatically goes to a call setup up routine or by querying the caller regarding such a feature. If the call is not to be customized, the call will proceed normally at step 120 and the default preferences of the called party will be utilized. If the call is to be customized a number of customizations may occur in steps 130, 150 and 170. It is understood that there may be more customizations and utilized by those skilled in the art than those shown in FIG. 1. FIG. 1 provides an example of the customizations possible. At step 130 it is determined if the call will be visible to bridged line appearances. If the call is not to be visible to bridged line appearances, then this preference will be marked in the call setup message at step 140 as discussed in this description. At step 150, it is determined if the call will allow bridge-ons. If bridge-ons are not allowed, at step 160 the preference is marked in the setup message. At step 170, it is determined if coverage path is allowed. If coverage paths are not allowed, at step 180 the preference is marked in the setup message. At step 190, the call proceeds with the appropriate preferences marked from steps 130, 150 and 170.

FIG. 2 shows a call treatment at an enterprise system. Similar to FIG. 1, the call setup shows a number of decision points in a process of customizing a call setup request executed in an enterprise system. At step 205, a caller external to the enterprise system (user C) initiates a call towards a call recipient (user B) within the enterprise system. At step 210 the enterprise system will receive the call. Based on how the enterprise system is configured (i.e. whether call treatment options are provided to external callers), the enterprise system will connect the call to a system for providing setup. The system may be an interactive voice response (IVR) system. The system will prompt the caller regarding different treatment options. As noted above and elsewhere, these treatment options may include allowance of calls to be visible to bridged line appearances, allowance of bridge-ons, disallowance of coverage path, and other options. At step 215, a caller internal to the enterprise system (user C) initiates a call towards a call recipient (user B) within the enterprise system. It is noted that steps 205 and 215 will not occur at the same time and are offered in FIG. 2 to indicate the different call initiation possibilities. Both steps 205 and 215 will proceed to 220 to the decision points being executed by the enterprise communication system 230. At step 231, it is determined if the call is to be visible to bridged line appearances. If the call is to be visible, at step 232 the enterprise system will generate a dialog state notification to bridged line appearance users. At step 233 it is determined if bridge-ons are allowed. If bridge-ons are not allowed, at step 234 bridge-ons will be disallowed to bridged line appearance users. If bridge-ons are allowed, the call will be set up between the calling party and bridged line users. At step 235 it is determined if call pickup is allowed. If call pickup is not allowed, at step 250 a failure will be returned to a party who tries to pick up the call. The failure may be any indication to the party attempting to pick up the call that pick ups are disallowed for that call. This may be a verbal message or audible tone to indicate that pick ups are disallowed or any other indication that those skilled in the art will understand are applicable for embodiments of the invention. At step 236 it is determined if coverage is allowed. If coverage is allowed, at step 260 the call will be covered to a coverage path if the called party does not answer the call. The coverage path may be used if, for example, the call is not answered with a certain period of time, after a certain number of rings or other criteria as determined by a user, system administrator or enterprise system default, for example. If coverage is not allowed, at step 270 an indication to the caller will be returned if the call is not answered. As with allowance of coverage, this may be after certain criteria are met as determined by a user, administrator or enterprise system default, for example.

The foregoing description of the invention has been presented for purposes of illustration and description. It is not intended to be exhaustive or to limit the invention to the precise form disclosed, and other modifications and variations may be possible in light of the above teachings. The embodiments were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for handling a call in a communications system, said communication system comprising a first telecommunications terminal external to an enterprise communication system, a second telecommunications terminal internal to said enterprise communication system, and a telecommunications network, said method comprising:

initiating a call from said first telecommunications terminal associated with a calling party to said second telecommunications terminal associated with a called party;

via a user of said first telecommunications terminal, providing system behavior preferences during setup of said call, wherein said system behavior preferences indicate how said enterprise communication system should treat bridging for said call at said second telecommunications terminal, including whether said call is visible to bridged line appearances;

applying said system behavior preferences during setup of said call to said call; and
proceeding with said call.

2. The method of claim 1, wherein applying said system behavior preferences comprises prompting said first telecommunications terminal, via an IVR (Interactive Voice Response) system, for coverage treatment preferences.

3. The method of claim 1, wherein applying said system behavior preferences comprises using Session Initiation Protocol (SIP) header parameters of an INVITE request associated with said call to specify said system behavior.

4. The method of claim 3, wherein if said call is not visible to bridged line appearances said session initiation protocol header is marked accordingly.

5. The method of claim 4, wherein said system behavior comprises whether said call allows bridge-ons, and if said call does not allow bridge-ons said session initiation protocol header is marked accordingly.

6. The method of claim 5, wherein said system behavior comprises whether coverage path is allowed and if coverage path is not allowed said session initiation protocol header is marked accordingly.

7. The method of claim 3, wherein said system behavior comprises whether coverage path is allowed and if coverage path is not allowed said session initiation protocol header is marked accordingly.

8. The method of claim 3, wherein applying system behavior to said call comprises prompting system behavior inputs from said first telecommunications terminal.

9. A method of handling a call in a communications system, said system comprising a first telecommunications terminal external to an enterprise network and a second telecommunications terminal in said enterprise network, said method comprising:
  initiating a call from said first telecommunication terminal associated with a calling party to said second telecommunications terminal associated with a called party;
  via a user of said first telecommunications terminal, providing system behavior preferences during setup of said call, wherein said system behavior preferences indicate how said enterprise network should treat bridging for said call at said second telecommunications terminal, including whether said call is visible to bridged line appearances;
  in said enterprise network, applying said system behavior preferences during setup of said call to said call; and
  proceeding with said call.

10. The method of claim 9, wherein applying said system behavior preferences comprises prompting said first telecommunications terminal, via an IVR (Interactive Voice Response) system, for coverage treatment preferences.

11. The method of claim 9, wherein applying said system behavior preferences comprises using session initiation protocol header parameters of an INVITE request associated with said call to specify said system behavior.

12. The method of claim 9, wherein said preferences of said first telecommunications terminal comprises whether call pickup is allowed, whether bridge-ons are allowed and whether coverage is allowed.

13. The method of claim 12, wherein said method further comprises, if said call is visible to bridged line appearances, generating a notification to bridged line appearance users.

14. The method of claim 12, wherein said method further comprises, if said call pick is not allowed, returning a notification to a user attempting to pickup said call that pickup is disallowed for said call.

15. A system for handling a call in a communication system, said system comprising:
  a first telecommunications terminal external to an enterprise system and associated with a calling party; and
  a second telecommunications terminal in the enterprise system and associated with a called party;
  wherein said first telecommunications terminal is enabled to initiate a call to said second telecommunications terminal via a session initiation protocol INVITE request and provide, via a user of said first telecommunications terminal, preferences that indicate how said enterprise system should treat bridging for the call, including whether said call is visible to bridged line appearances, and said enterprise system is enabled, during setup of said call, to apply system call settings to said call based on preferences, determined during setup of said call via a user of said first telecommunication terminal and which indicate how said enterprise network should treat bridging for said call at said second telecommunications terminal, of said first telecommunications terminal.

16. The system of claim 15, wherein said call settings comprise whether call pickup is allowed, whether call coverage is allowed, and whether bridge-ons are allowed.

17. The system of claim 16, wherein if said call is to be visible to bridged line appearances, said enterprise system generates notifications to bridged line appearance users.

18. The system of claim 16, wherein if said call is to not allow pick-ups, said enterprise system returns a notification to a user attempting to pick-up said call.

19. The system of claim 15, wherein said enterprise system applies said system call settings by prompting said first telecommunications terminal and applying responses to said prompting in a session initiation protocol INVITE request associated with said call.

* * * * *